US012686124B2

(12) United States Patent
Wang et al.

(10) Patent No.: US 12,686,124 B2
(45) Date of Patent: Jul. 21, 2026

(54) ROBOT CONTROL DEVICE WHICH CONTROLS ROBOT ON BASIS OF MECHANISM DATA, AND OPERATION PROGRAM CORRECTION DEVICE

(71) Applicant: Fanuc Corporation, Minamitsuru-gun (JP)

(72) Inventors: Yuelai Wang, Minamitsuru-gun (JP); Yasuhiro Naitou, Minamitsuru-gun (JP); Kunihiko Harada, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 272 days.

(21) Appl. No.: 18/572,398

(22) PCT Filed: Jul. 21, 2021

(86) PCT No.: PCT/JP2021/027386
§ 371 (c)(1),
(2) Date: Dec. 20, 2023

(87) PCT Pub. No.: WO2023/002624
PCT Pub. Date: Jan. 26, 2023

(65) Prior Publication Data
US 2024/0367326 A1     Nov. 7, 2024

(51) Int. Cl.
*B25J 9/16*     (2006.01)
*B25J 13/08*     (2006.01)

(52) U.S. Cl.
CPC ........... *B25J 9/1656* (2013.01); *B25J 9/1651* (2013.01); *B25J 9/1664* (2013.01); *B25J 13/088* (2013.01);
(Continued)

(58) Field of Classification Search
CPC ...... B25J 9/1651; B25J 9/1656; B25J 9/1664; B25J 13/088; G05B 2219/40387; G05B 2219/45104
See application file for complete search history.

(56) References Cited

U.S. PATENT DOCUMENTS

2009/0210093 A1* 8/2009 Jacobsen .................. A61H 3/00
                                                                      700/260
2016/0039092 A1    2/2016 Harada et al.
(Continued)

FOREIGN PATENT DOCUMENTS

CN        105312632 A      2/2016
CN        106113066 A      11/2016
(Continued)

OTHER PUBLICATIONS

International Search Report and Written Opinion for International Application No. PCT/JP2021/027386, dated Oct. 19, 2021, 7 pages.

*Primary Examiner* — Dale Moyer
(74) *Attorney, Agent, or Firm* — BUCHANAN INGERSOLL & ROONEY PC

(57) ABSTRACT

A robot control device includes an operation control unit which controls the operation of a robot based on mechanism data. The mechanism data includes a parameter for calculating the relationship between an angle in a joint part of the robot and a distal end position of the robot. The control device also includes an acquisition unit which acquires a plurality of predetermined sets of mechanism data, a selection unit which selects one set of mechanism data from the plurality of sets of mechanism data, and a switching operation setting unit that sets the operation of the robot when changing the mechanism data.

14 Claims, 14 Drawing Sheets

(52) U.S. Cl.
    CPC .............. *G05B 2219/40387* (2013.01); *G05B 2219/45104* (2013.01)

(56) References Cited

U.S. PATENT DOCUMENTS

| | | | |
|---|---|---|---|
| 2016/0327934 A1 | 11/2016 | Morimoto | |
| 2018/0304467 A1 | 10/2018 | Matsuura et al. | |
| 2019/0126473 A1 | 5/2019 | Sato et al. | |
| 2020/0078947 A1 | 3/2020 | Wang et al. | |
| 2020/0094399 A1* | 3/2020 | Shindo .............. | H01L 21/67196 |
| 2020/0189112 A1* | 6/2020 | Kuruvilla ............... | B25J 9/1692 |
| 2020/0238521 A1 | 7/2020 | Kogan | |
| 2020/0306976 A1* | 10/2020 | Yuelai .................... | B25J 9/1653 |
| 2023/0330852 A1 | 10/2023 | Kurihara et al. | |

FOREIGN PATENT DOCUMENTS

| | | |
|---|---|---|
| CN | 108025433 A | 5/2018 |
| JP | 59229609 A | 12/1984 |
| JP | 2002127054 A | 5/2002 |
| JP | 5531996 B2 | 6/2014 |
| JP | 2015027730 A | 2/2015 |
| JP | 2019081208 A | 5/2019 |
| JP | 2020049568 A | 4/2020 |
| JP | 2020-168669 A | 10/2020 |
| JP | 6823024 B2 | 1/2021 |
| JP | 2021091025 A | 6/2021 |

* cited by examiner

ROBOT CONTROL DEVICE WHICH CONTROLS ROBOT ON BASIS OF MECHANISM DATA, AND OPERATION PROGRAM CORRECTION DEVICE

CROSS REFERENCE TO RELATED APPLICATIONS

This is the U.S. National Phase application of PCT/JP2021/027386, filed Jul. 21, 2021, the disclosure of this application being incorporated herein by reference in its entirety for all purposes.

FIELD OF THE INVENTION

The present invention relates to a controller for a robot that controls the robot based on mechanism data, and a correction device for an operation program.

BACKGROUND OF THE INVENTION

A robot device includes a robot and an operation tool attached to the robot. By driving the robot, various work can be performed while changing a position and orientation of the operation tool. The position and orientation of the robot preferably closely match a desired position and orientation specified in an operation program. However, the position and orientation of the robot may slightly deviate from the desired position and orientation due to manufacturing errors of components of the robot when manufacturing the robot, the influence of gravity when driving the robot, and the like.

Errors in the lengths of arms between joint axes or the like are conceivable as causes of the deviation of the actual position of the robot from the desired position. A method of setting such items as mechanism error parameters and setting a value for each of the mechanism error parameters is known in the related art. For example, a cell including a plurality of robot devices can be formed in an off-line simulation device or the like. Methods of setting mechanism error parameters in robot devices are known (e.g., Japanese Patent No. 6823024 B and Japanese Patent No. 5531996 B).

PATENT LITERATURE

PTL 1: Japanese Patent No. 6823024B
PTL 2: Japanese Patent No. 5531996 B

SUMMARY OF THE INVENTION

A controller for a robot can control drive motors for driving each component based on mechanism data including mechanism error parameters. An actual position and orientation of the robot can be brought closer to a desired position and orientation by accurately setting parameters included in the mechanism data in correspondence with the robot.

However, optimal parameters of the mechanism data change in response to a state in which the robot operates. The optimal parameters change, for example, in response to contents of work performed by the robot device, an area in which the robot operates, a load applied when driving the robot, and the like. There are many states in which the robot operates. However, when driving a robot device by using fixed mechanism data, it is difficult to improve the accuracy of the position and orientation of the robot. In other words, it is difficult to improve the accuracy of work performed by the robot device.

A first aspect of the present disclosure is a controller for a robot having a joint. The controller includes an operation control unit configured to control an operation of the robot based on mechanism data including a parameter for calculating a relationship between an angle of the joint of the robot and a distal end position of the robot. The controller includes an acquiring unit configured to acquire a plurality of pieces of the mechanism data that are predetermined and a selecting unit configured to select one piece of the mechanism data from the plurality of pieces of the mechanism data. The controller includes a switching operation setting unit configured to set an operation of the robot when changing the mechanism data.

A second aspect of the present disclosure is a correction device for an operation program of a robot having a joint. The correction device includes a storage part configured to store mechanism data including a parameter for calculating a relationship between an angle of the joint of the robot and a distal end position of the robot. The correction device includes an acquiring unit configured to acquire, from the storage part, a plurality of pieces of the mechanism data created in advance. The correction device includes a display part including an area for displaying the plurality of pieces of the mechanism data and an area for displaying the operation program and an input part through which an operator operates an image displayed on the display part. The correction device includes a selecting unit configured to select one piece of the mechanism data from the plurality of pieces of the mechanism data in response to an operation of the input part by the operator and a program correcting unit configured to correct the operation program based on the one piece of the mechanism data selected by the selecting unit.

According to an aspect of the present disclosure, it is possible to provide a controller for a robot and a correction device for an operation program that can drive a robot with high accuracy in response to various states of the robot.

BRIEF DESCRIPTION OF DRAWINGS

FIG. 8 is a perspective view of the robot for illustrating a specific area for performing the third control.

FIG. 9 is a graph for illustrating fourth control of the first robot device.

FIG. 11 is a block diagram of a second robot device including a correction device according to a second embodiment.

DETAILED DESCRIPTION OF EMBODIMENTS
OF THE INVENTION

First Embodiment

Figure 1:
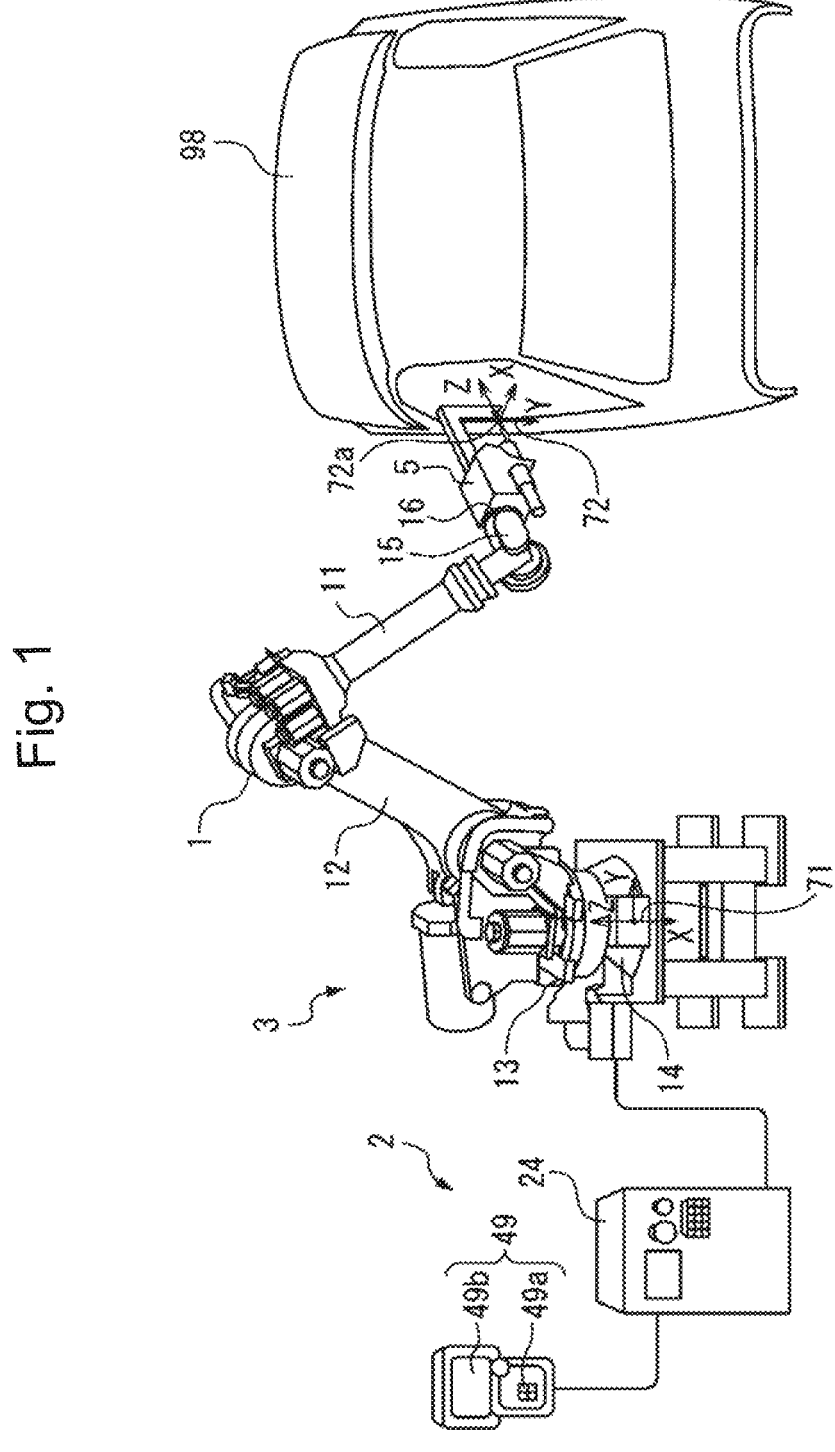
FIG. 1 is a perspective view of a first robot device and a workpiece according to a first embodiment.
Figure 2:
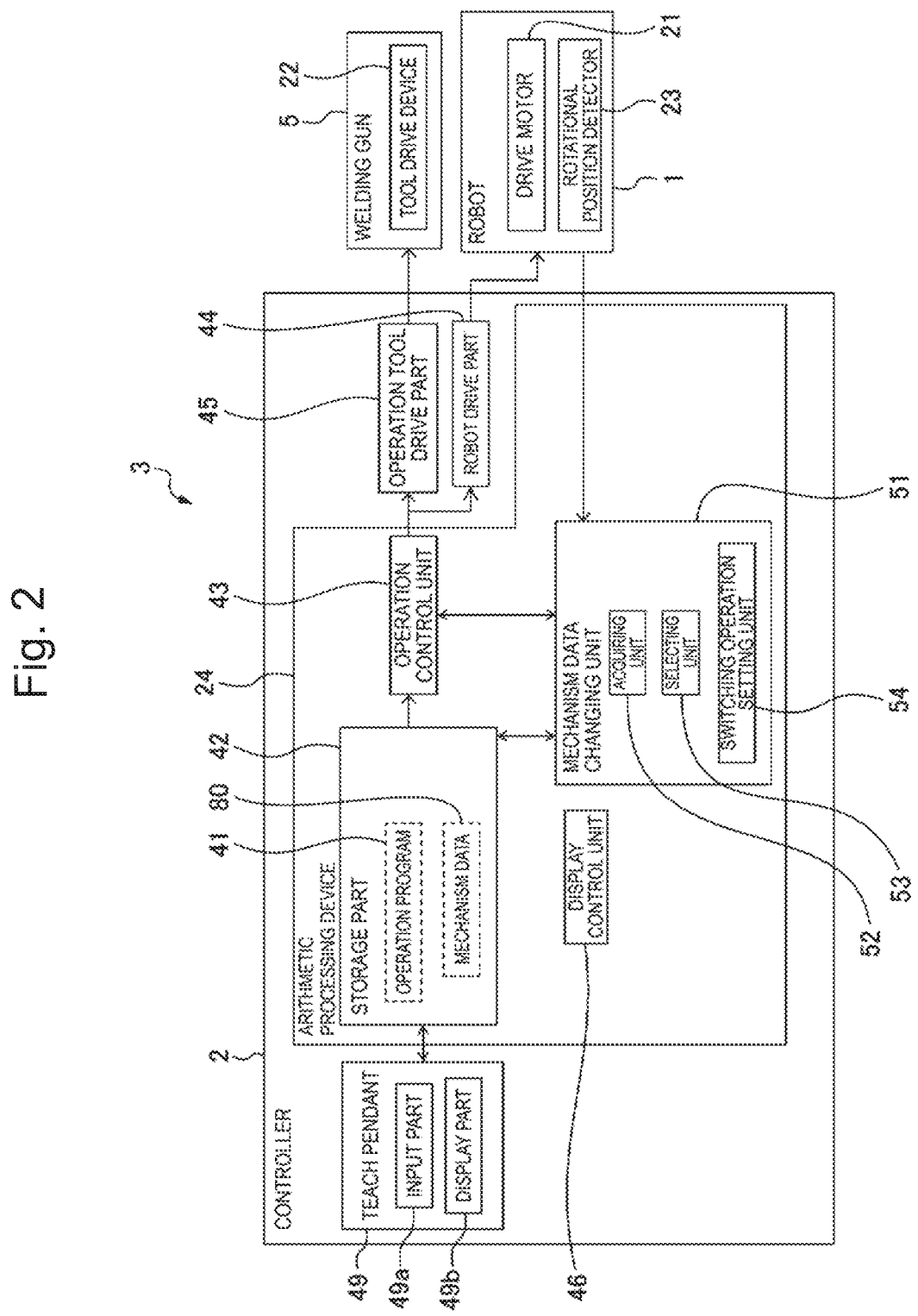
FIG. 2 is a block diagram of the first robot device.

A controller for a robot according to a first embodiment will be described with reference to FIGS. 1 to 10. FIG. 1 is a perspective view of a first robot device according to the present embodiment. FIG. 2 is a block diagram of the first robot device according to the present embodiment. Referring to FIGS. 1 and 2, the first robot device 3 includes a welding gun 5 which is an operation tool and a robot 1 that changes a position and orientation of the welding gun 5. The robot device 3 includes a controller 2 that controls the robot 1 and the welding gun 5.

The first robot device 3 performs spot welding on a workpiece 98. The workpiece 98 of the embodiment is a body of an automobile. The robot device 3 performs spot welding at predetermined welding points. Plate-like members facing each other are welded.

The robot can have one or more joints in order to change inclinations of the components. The robot 1 of the present embodiment is an articulated robot including a plurality of joints. The robot 1 includes an upper arm 11 and a lower arm 12. The lower arm 12 is supported by a swivel base 13. The swivel base 13 is supported by a base 14. The robot 1 includes a wrist 15 connected to an end portion of the upper arm 11. The wrist 15 includes a flange 16 that fixes the welding gun 5. Components such as the upper arm 11 and the lower arm 12 are connected via joints.

The robot 1 of the present embodiment includes drive motors 21 that drive the components of the robot 1. The drive motors 21 of the present embodiment are disposed in the swivel base 13, the upper arm 11, the lower arm 12, the wrist 15, the flange 16, and the like as the components. The welding gun 5 includes a tool drive device 22 that drives the welding gun 5. The tool drive device 22 of the present embodiment includes a motor that drives a movable electrode with respect to a fixed electrode of the welding gun 5.

The robot 1 of the present embodiment is a vertical articulated robot, but is not limited to this form. A robot can be adopted that changes a position and orientation there with a joint mechanism of choice. The operation tool of the present embodiment is the welding gun 5 for performing spot welding, but is not limited to this form. An operator can select an operation tool according to work to be performed by the robot device. For example, a hand or the like for gripping a workpiece can be adopted as the operation tool.

The controller 2 includes an arithmetic processing device 24 (a computer) that includes a Central Processing Unit (CPU) as a processor. The arithmetic processing device 24 includes a Random Access Memory (RAM), a Read Only Memory (ROM), and the like which are connected to the CPU via a bus. The robot device 3 automatically drives the robot 1 and the welding gun 5 based on an operation program 41 created in advance.

The arithmetic processing device 24 of the controller 2 includes a storage part 42 that stores information regarding control of the robot device 3. The storage part 42 can be made of a non-temporary storage medium capable of storing information. For example, the storage part 42 can be made of a storage medium such as a volatile memory, a nonvolatile memory, a magnetic storage medium, or an optical storage medium. The operation program 41 through which the robot device 3 performs spot welding is stored in the storage part 42.

It should be noted that the storage part of the present embodiment is incorporated in the arithmetic processing device 24 that is arranged at a main body part of the controller 2, but the present embodiment is not limited to this form. A storage device such as a server functioning as a storage part may be connected to the arithmetic processing device via an electrical communication line.

The arithmetic processing device 24 includes an operation control unit 43 that sends an operation command. The operation control unit 43 of the present embodiment controls the operation of the robot 1 based on the operation program 41 and mechanism data 80. The operation control unit 43 sends, to a robot drive part 44, an operation command for driving the robot 1. The robot drive part 44 includes an electrical circuit that drives the drive motors 21. The robot drive part 44 supplies electricity to the drive motors 21 based on the operation command. The operation control unit 43 also sends, to an operation tool drive part 45, an operation command for driving the tool drive device 22. The operation tool drive part 45 includes an electrical circuit that energizes electrodes and an electrical circuit that drives a motor of a movable electrode. The operation tool drive part 45 supplies electricity to the tool drive device 22 based on the operation command.

The operation control unit 43 corresponds to a processor that is driven in accordance with the operation program 41 of the robot device 3. The processor functions as the operation control unit 43 by reading the operation program 41 and performing control defined in the operation program 41.

The arithmetic processing device 24 includes a mechanism data changing unit 51 that changes mechanism data regarding the robot. The mechanism data changing unit 51 includes an acquiring unit 52 that acquires a plurality of pieces of the predetermined mechanism data 80 from the storage part 42. The mechanism data changing unit 51 includes a selecting unit 53 that selects one piece of the mechanism data from the plurality of pieces of the mechanism data and a switching operation setting unit 54 that sets an operation of the robot when changing the mechanism data. The arithmetic processing device 24 includes a display control unit 46 that controls an image displayed on a display part 49b.

The mechanism data changing unit 51 and the display control unit 46 each correspond to a processor that is driven in accordance with a predetermined program. The acquiring unit 52, the selecting unit 53, and the switching operation setting unit 54 included in the mechanism data changing unit 51 each correspond to a processor that is driven in accordance with a predetermined program. The processor functions as each unit by reading the program and performing control defined in the program.

The robot 1 includes a state detector for detecting the position and orientation of the robot 1. The state detector according to the present embodiment includes a rotational position detector 23 attached to the drive motor 21 of each joint axis. Each rotational position detector 23 is made of, for example, an encoder. The position and orientation of the robot 1 are detected from outputs of the rotational position detectors 23.

The controller 2 includes a teach pendant 49 serving as an operation panel through which the operator operates the robot device 3. The teach pendant 49 includes an input part 49a for inputting information regarding the robot 1 and the welding gun 5. The input part 49a is made of operating members such as a keyboard, buttons, and dials. The teach pendant 49 includes the display part 49b that displays information regarding control of the robot device 3. The display part 49b is made of a display panel such as a liquid crystal display panel. It should be noted that when the teach pendant includes a touch panel-type display panel, the display panel functions as an input part and a display part.

A world coordinate system 71 that does not move when the position and orientation of the robot 1 change is set for the robot device 3 of the present embodiment. The world coordinate system is also called a reference coordinate system. In the example illustrated in FIG. 1, the origin of the world coordinate system 71 is placed at the base 14 of the robot 1. The position of the origin and the directions of the coordinate axes of the world coordinate system 71 are fixed. Even if the position and orientation of the robot 1 change, the position and orientation of the world coordinate system 71 do not change.

A tool coordinate system 72 having an origin set at a position of choice on the operation tool is set for the robot device 3. The tool coordinate system 72 changes in position and orientation together with the welding gun 5. In the present embodiment, the origin of the tool coordinate system 72 is set at a tool center point 72a (a distal end point of the fixed electrode). In the present embodiment, the position of the robot 1 corresponds to the position of the tool center point (the position of the origin of the tool coordinate system 72). The orientation of the robot 1 corresponds to the orientation of the tool coordinate system 72 with respect to the world coordinate system 71.

Figure 3:
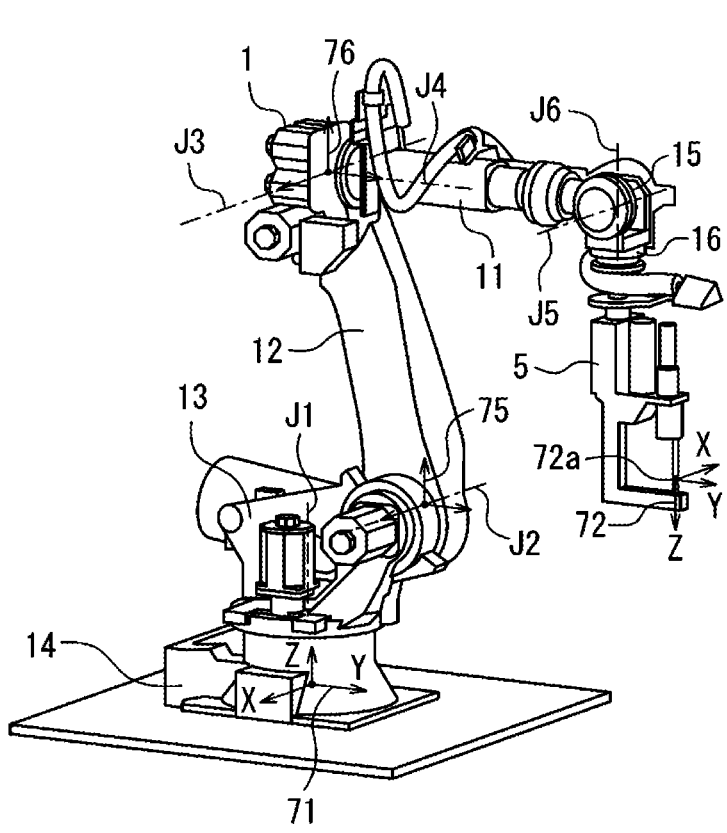
FIG. 3 is a perspective view of a robot of the first robot device.

FIG. 3 shows a perspective view of the robot and the welding gun of the present embodiment. FIG. 3 illustrates joint axes J1 to JN of the joints. Joint axes J1 to J6 are illustrated because the robot 1 of the present embodiment has six axes. Angles DJ1 to DJN of the joints are defined for the respective joint axes J1 to JN. For example, the angle of a joint corresponds to the angle between components in the joint. The angle of each joint corresponds to a rotational position of the drive motor 21 arranged corresponding to each of the joints.

Referring to FIGS. 2 and 3, the position and orientation of the robot 1 may deviate from a desired position and orientation due to manufacturing errors of the components of the robot 1, assembly errors when assembling the robot, the influence of gravity, and the like. In the present embodiment, the mechanism data 80 for adjusting the position and orientation of the robot 1 is set separately from the operation program 41.

The mechanism data 80 includes parameters for calculating a relationship between the angles of the joints of the robot 1 and the distal end position of the robot. The mechanism data 80 is created in advance and stored in the storage part 42.

The mechanism data 80 includes mechanism error parameters. The mechanism error parameters include DH parameters. The DH parameters are parameters of the Denavit Hartenberg (DH) method. In the DH method, a coordinate system is set for each joint axis, and the position and orientation of the robot can be expressed based on the relationship between the coordinate systems of joint axes that are adjacent to each other. The DH method uses parameters $a_i$, $\alpha_i$, $d_i$, and $\theta_i$. The parameter $\theta_i$ is the angle between links, the parameter $d_i$ is the distance between links (link length), the parameter $a_i$ is the distance between joint axes, and the parameter $\alpha_i$ is the torsion angle between joint axes.

The mechanism error parameters also include an error in the position of the origin of the world coordinate system 71, errors in the DH parameters, the amounts of deflection of the components due to torque around the joint axes, an error in the gear ratio of a speed reducer, and the like.

Parameters other than the mechanism error parameters included in the mechanism parameters include output values of the rotational position detectors 23 when the position of the robot is arranged at a predetermined reference position. For example, the parameters include pulse output values of the encoders when the robot 1 is arranged at a zero position.

The mechanism data also includes a matrix or a relational expression indicating the relative positional relationship between adjacent joints in the robot. The mechanism data includes a transformation matrix T that defines the positional relationship between adjacent joints determined by the DH parameters. The mechanism data also includes a relational expression obtained by expanding the transformation matrix T.

Referring to FIG. 3, a coordinate system 75 indicates a coordinate system for a kth joint. A coordinate system 76 indicates a coordinate system for a (k+1)th joint next to the kth joint. Assuming a transformation matrix $T_k$ for calculating the (k+1)th coordinate system from the kth coordinate system and a transformation matrix $T_{UT}$ for calculating the tool coordinate system from the flange coordinate system, a transformation matrix $T_{1P}$ for calculating a position $P_P$ of the tool center point from the first coordinate system can be expressed by the following equation (1).

$$T_{1P} = T_1 T_2 \ldots T_n T_{UT} \tag{1}$$

A relational expression for calculating the position $P_P$ of the tool center point from the first coordinate system can be obtained by expanding the transformation matrix of equation (1). This transformation matrix or relational expression may have errors with respect to design values. For example, the mechanism data may be a transformation matrix or a relational expression defined by a parameter $(a_i+\Delta a_i)$ having an error $\Delta a_i$ with respect to the parameter $a_i$ which is a design value and a parameter $(\alpha_i+\Delta\alpha_i)$ having an error $\Delta\alpha_i$ with respect to the parameter $\alpha_i$ which is a design value.

The mechanism data includes at least one selected from among the mechanism error parameters and the parameters other than mechanism errors. In other words, the mechanism data includes at least one or more parameters for driving the robot 1 based on variables that determine the position and orientation of the robot 1, the variables being defined in the operation program.

Referring to FIGS. 2 and 3, a plurality of pieces of mechanism data are stored in the storage part 42 in the controller 2 of the present embodiment. Control for switching mechanism data is performed according to the driving state of the robot device 3, the configuration of the robot device 3, the operation program, and the like.

Figure 4:
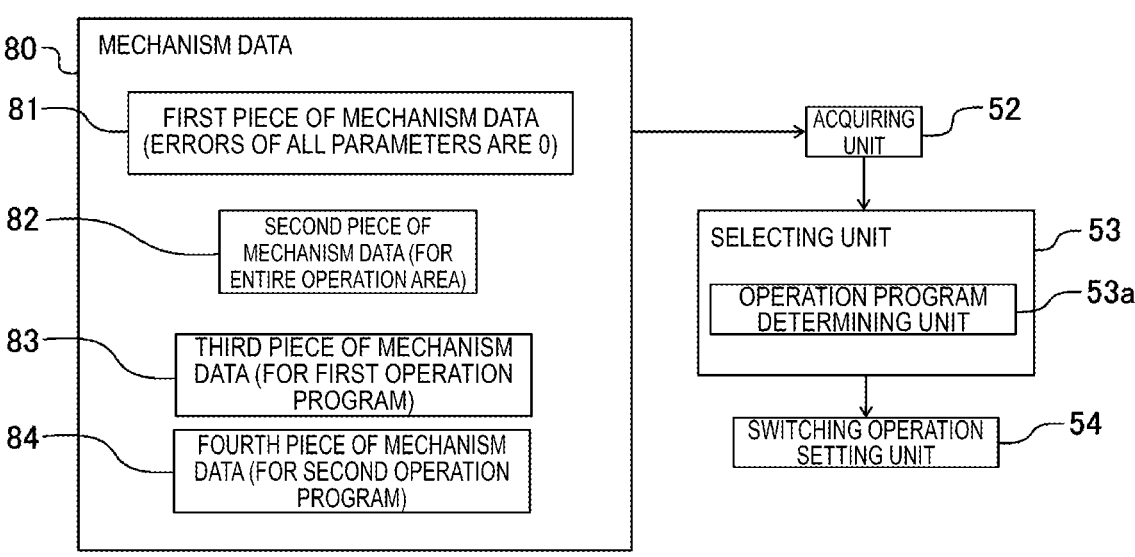
FIG. 4 is a block diagram for illustrating first control of the first robot device.

FIG. 4 shows a block diagram for illustrating first control of the first robot device of the present embodiment. Referring to FIGS. 2 and 4, in the first control, control for switching mechanism data is performed in response to an operation program to be used. In the first control, a first piece of mechanism data 81, a second piece of mechanism data 82, a third piece of mechanism data 83, and a fourth piece of mechanism data 84 are stored in the storage part 42 as the mechanism data 80. Each of the pieces of mechanism data 81, 82, 83, and 84 is created in advance by the operator.

The first piece of mechanism data 81 includes all parameters required to drive the robot 1. In the first piece of mechanism data 81, all parameter errors included in the mechanism data are 0. Ideal values at the time of designing the robot 1 are adopted for the parameters. In other words, all parameters included in the first piece of mechanism data 81 are design values.

Parameters that are applied to an entire area in which the robot 1 can operate are set in the second piece of mechanism data 82. The second piece of mechanism data 82 includes all parameters required to drive the robot 1. The parameters of the second piece of mechanism data 82 are set so that the accuracy of the position and orientation of the robot 1 is improved on average over the entire area in which the robot 1 operates. The first piece of mechanism data 81 and the second piece of mechanism data 82 may be created, for example, when the robot 1 is manufactured in a factory.

The operator can create a plurality of operation programs according to work to be performed by the robot device 3. In the example illustrated in FIG. 4, a first operation program and a second operation program are stored in the storage part 42. The third piece of mechanism data 83 is set so that the position and orientation of the robot 1 are controlled with high accuracy when the robot device 3 is driven by the first operation program. The fourth piece of mechanism data 84 is set so that the position and orientation of the robot 1 are controlled with high accuracy when the robot device 3 is driven by the second operation program. The operator can generate the third piece of mechanism data 83 and the fourth piece of mechanism data 84 in advance according to the contents of work performed by the corresponding operation program, the operation speed of the robot, the work area, and the like.

Each of the third piece of mechanism data 83 and the fourth piece of mechanism data 84 of the present embodiment includes all parameters for driving the robot 1. The third piece of mechanism data 83 and the fourth piece of mechanism data 84 may include a part of the parameters for driving the robot 1. In this case, for parameters not included in the third piece of mechanism data 83 or the fourth piece of mechanism data 84, the parameter values of the first piece of mechanism data 81 or the parameter values of the second piece of mechanism data 82 can be adopted.

In the first control of the first robot device 3, the acquiring unit 52 of the mechanism data changing unit 51 acquires the plurality of pieces of mechanism data 81, 82, 83, and 84 from the storage part 42. The selecting unit 53 selects one piece of mechanism data from the plurality of pieces of mechanism data. In the first control, the selecting unit 53 includes an operation program determining unit 53a that determines the operation program to be used. In the present case, a case in which the first operation program is used will be described as an example.

The operation program determining unit 53a identifies the operation program to be used in the current work. The selecting unit 53 selects mechanism data based on the operation program to be used. For example, the operation program determining unit 53a automatically determines that the first operation program is used in the current work based on information described in the operation program. The selecting unit 53 selects the third piece of mechanism data 83 generated for the first operation program from the plurality of pieces of mechanism data.

Alternatively, the operation program determining unit 53a may determine that the operation program to be used in the current work is the first operation program based on an operation of the input part 49a by the operator. When the mechanism data selected by the selecting unit 53 differs from the current mechanism data, the switching operation setting unit 54 sets an operation of the robot 1 for changing the mechanism data.

Figure 5:
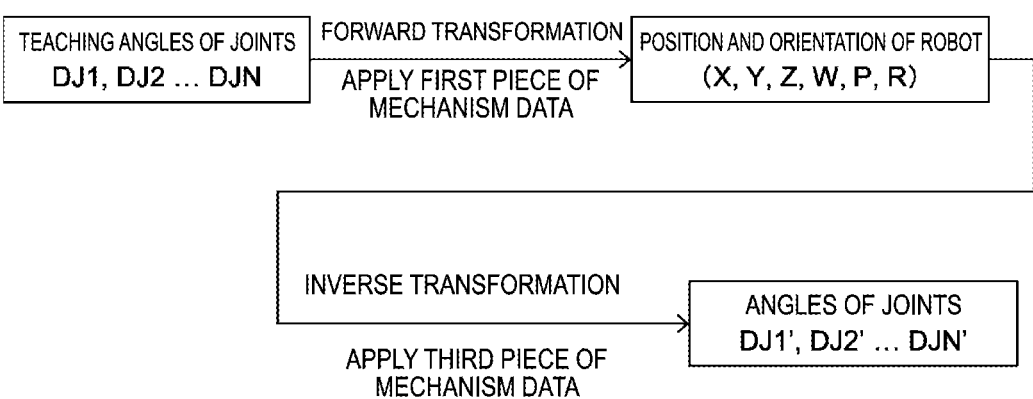
FIG. 5 is a block diagram for illustrating control for calculating angles of joints in the first control of the first robot device.

FIG. 5 shows a block diagram for explaining control performed when switching mechanism data. In this example, the switching operation setting unit 54 switches the currently used first piece of mechanism data 81 to the third piece of mechanism data 83. The operation program 41 includes position data composed of variables that determine the positions and orientations of the robot at teaching points. The angles of the joints are set in the position data of the present embodiment as variables. Teaching angles DJ1 to DJN of the joints up to an Nth axis are specified in the position data. The angles of the joints correspond to the rotational positions of the drive motors 21 arranged at the respective joint axes. The variables of the position data are not limited to the angles of the joints. For example, the position and orientation of the tool coordinate system 72 may be specified by the coordinate values of the world coordinate system 71 as variables of the position data.

The switching operation setting unit 54 calculates the position and orientation of the robot (the position and orientation of the tool coordinate system 72) by forward kinematics transformation (forward kinematics) by using the teaching angles DJ1 to DJN of the joints. For example, the orthogonal positions of the tool center point 72a in the world coordinate system 71 are calculated. The switching operation setting unit 54 calculates the position and orientation of the robot by applying the first piece of mechanism data 81 as mechanism data before having been switched thereto. The position and orientation of the robot calculated here are the position and orientation desired by the operator.

Next, the switching operation setting unit 54 calculates angles DJ1' to DJN' of the joints by performing inverse kinematics transformation (inverse kinematics) based on the position and orientation of the robot. At this time, the switching operation setting unit 54 applies the third piece of mechanism data 83, after having been switched thereto, selected by the selecting unit 53.

The switching operation setting unit 54 creates an operation command for the robot 1 so that the angles of the joints change from the teaching angles DJ1 to DJN to the angles DJ1' to DJN'. The operation control unit 43 changes the position and orientation of the robot 1 based on the command from the switching operation setting unit 54.

In this way, the switching operation setting unit 54 sets an operation of the robot 1 for changing the position and orientation of the robot 1 based on the current mechanism data to the position and orientation of the robot 1 calculated based on the mechanism data selected by the selecting unit 53. In the subsequent control as well, the operation control unit 43 controls the operation of the robot 1 by using the first operation program and the third piece of mechanism data 83 selected by the selecting unit 53 as in the control described above.

Work to be performed by the robot device is defined in the operation program of the robot device. The positions and orientations that the robot can take, the work range of the robot, an operation tool attached to the robot, and the like are determined in response to the work of the robot device. By using mechanism data created in accordance with an operation program, it is possible to control the position and orientation of the robot for work performed based on the operation program with high accuracy. The mechanism data changing unit 51 can change the mechanism data to mechanism data capable of driving the robot with high accuracy in correspondence with an operation program to be used in the current work.

The above embodiment has been described with respect to control for determining the operation program and mechanism data to be used as an example, but the embodiment is not limited to this form. The operation program can include a command statement specifying mechanism data. The selecting unit 53 can select mechanism data specified in the operation program. For example, a command statement indicating use of the third piece of mechanism data can be recorded in a beginning part of the first operation program. The selecting unit 53 can select the third piece of mechanism data from the plurality of pieces of mechanism data based on the command statement.

Alternatively, mechanism data may be switched while an operation program is being executed. A command statement specifying predetermined mechanism data can be described with respect to a specific command statement for operation of the robot among a plurality of command statements for operation of the robot included in the operation program. When the specific command statement for operation is executed, the mechanism data is changed to the mechanism data specified in the command statement. Then, the robot can be driven by using the original mechanism data after control based on the specific command statement is completed.

Figure 6:
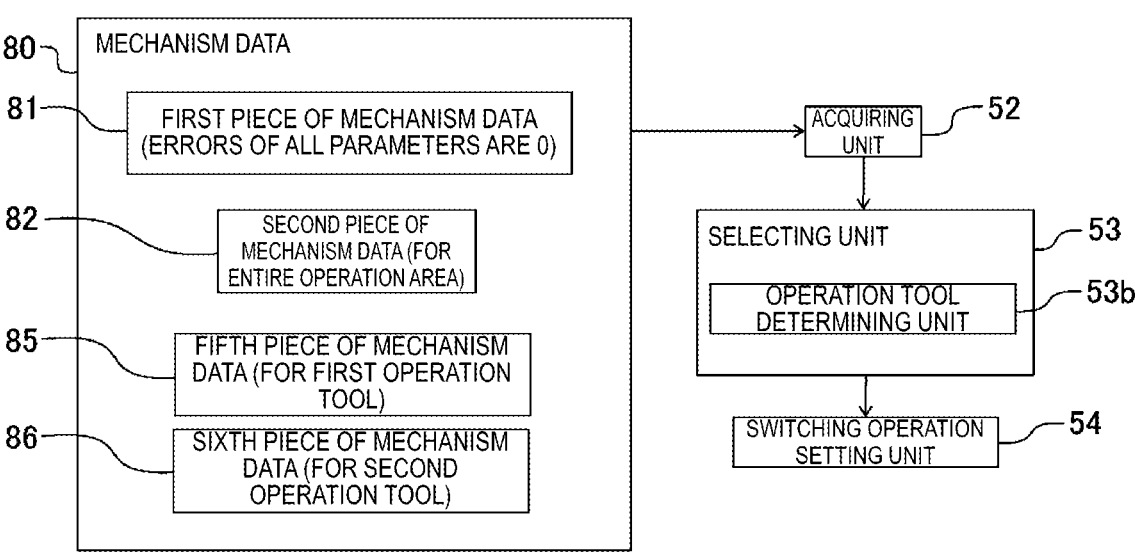
FIG. 6 is a block diagram for illustrating second control of the first robot device.

FIG. 6 shows a block diagram for explaining second control of the first robot device according to the present embodiment. In the second control, mechanism data is switched in accordance with the operation tool attached to the robot 1. Mechanism data 80 for the second control includes a fifth piece of mechanism data 85 for using a first operation tool and a sixth piece of mechanism data 86 for using a second operation tool in addition to the first piece of mechanism data 81 and the second piece of mechanism data 82. The fifth piece of mechanism data 85 is set with parameters so that the position and orientation of the robot can be controlled with high accuracy when the first operation tool is used. The sixth piece of mechanism data 86 is set with parameters so that the position and orientation of the robot can be controlled with high accuracy when the second operation tool is used.

The acquiring unit 52 acquires the first piece of mechanism data 81, the second piece of mechanism data 82, the fifth piece of mechanism data 85, and the sixth piece of mechanism data 86 from the storage part 42. The selecting unit 53 includes an operation tool determining unit 53b. The operation tool determining unit 53b can determine the operation tool to be used based on information of the operation program. Alternatively, the operation tool determining unit 53b may determine the operation tool to be used in response to an operation of the input part 49a by the operator. Alternatively, when the operation tool has a function of communicating with the operation tool determining unit 53b, the operation tool to be used may be automatically determined through communication with the operation tool.

In this case, an example of using the first operation tool from among the first operation tool and the second operation tool will be described. The operation tool determining unit 53b determines that the first operation tool is to be used. The selecting unit 53 selects the fifth piece of mechanism data 85 corresponding to the first operation tool from the plurality of pieces of mechanism data.

The switching operation setting unit 54 sets an operation of the robot 1 for changing the currently selected mechanism data to the fifth piece of mechanism data. The operation control unit 43 changes the position and orientation of the robot based on an operation command from the switching operation setting unit 54. In the subsequent control, the operation control unit 43 controls the robot based on the fifth piece of mechanism data 85 and the operation program 41.

The weight of the operation tool, the position of the center of gravity of the operation tool, and the like may change when the operation tool is replaced. Alternatively, the range of positions and orientations of the robot, the operating speed of the robot, or the like may change depending on the operation tool. In the second control, the position and orientation of the robot can be controlled with high accuracy by performing switching to mechanism data corresponding to the operation tool.

Figure 7:
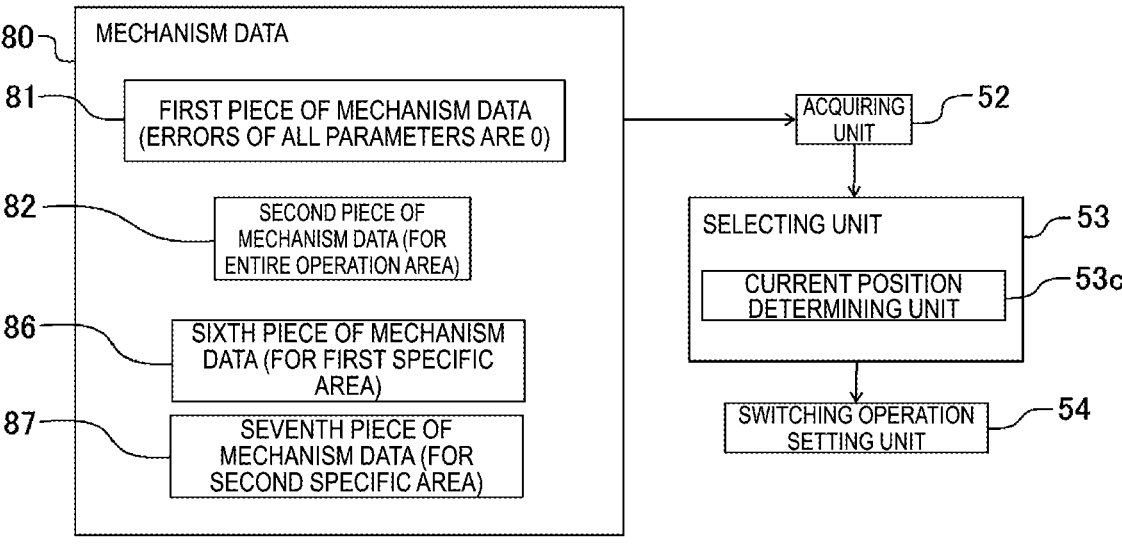
FIG. 7 is a block diagram for illustrating third control of the first robot device.

FIG. 7 shows a block diagram for explaining third control of the first robot device according to the present embodiment. In the third control, mechanism data is switched according to a work area of the robot 1. The mechanism data 80 for the third control includes a sixth piece of mechanism data 86 for a first specific area, and a seventh piece of mechanism data 87 for a second specific area different from the first specific area in addition to the first piece of mechanism data 81 and the second piece of mechanism data 82. Each piece of mechanism data 86 and 87 is generated so that the robot 1 can be driven with high accuracy when the position of the robot 1 is located inside the respective specific area.

Figure 8:
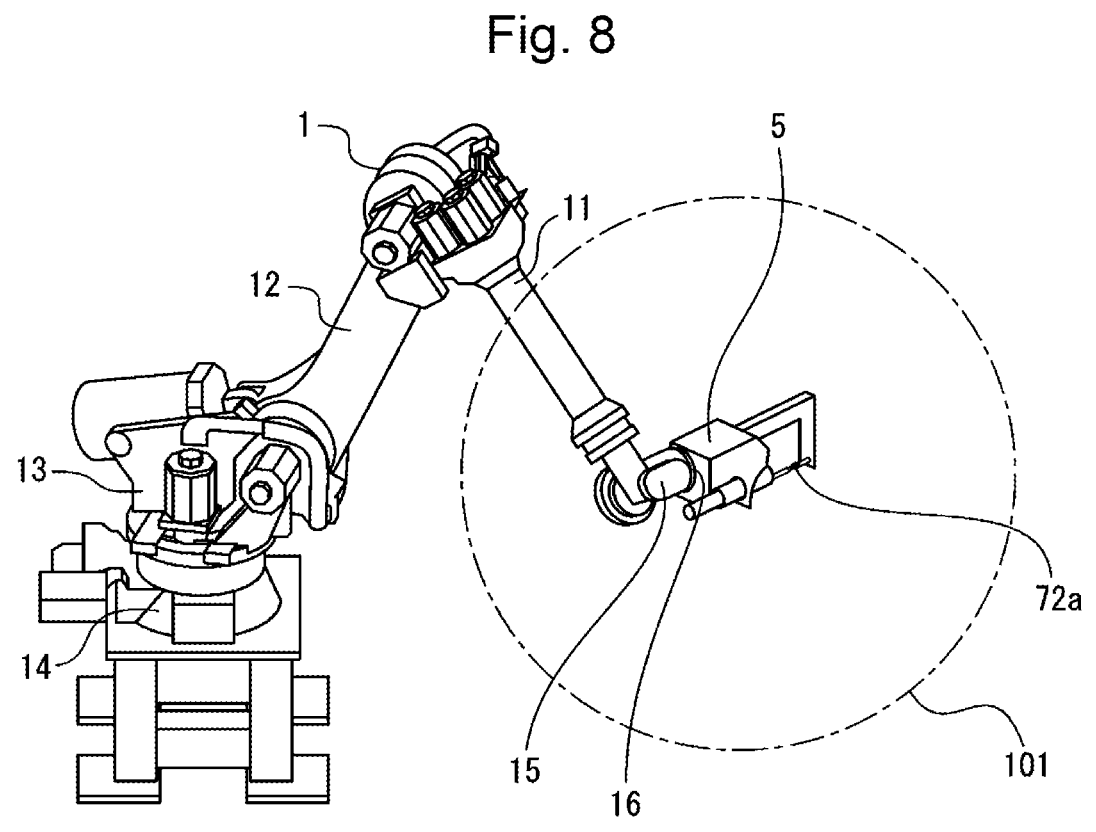

FIG. 8 shows a perspective view of the robot for explaining a specific area of the robot. A part of the area in which the robot 1 is driven is predetermined as a specific area. In this example, a first specific area 101 which is spherical is defined in the area in which the tool center point 72a of the robot device 3 moves. For example, the first specific area 101 is defined by a range of positions of the tool center point 72a with their coordinate values of the world coordinate system 71. Alternatively, the specific area may be defined by a range of angles of the joints of the joint axes. Such a specific area can be specified, for example, by a command statement in the operation program. Alternatively, the mechanism data may include therein a condition for specifying the specific area.

Referring to FIGS. 7 and 8, in this example, the robot 1 is driven by using the second piece of mechanism data 82 targeted for the entire operation area of the robot 1 before the mechanism data is switched. The acquiring unit 52 acquires a plurality of the pieces of mechanism data 81, 82, 86, and 87. The selecting unit 53 in the third control includes a current position determining unit 53c that determines the current position of the robot 1. The current position determining unit 53c calculates the current position of the robot 1 based on the outputs of the rotational position detectors 23 and the second piece of mechanism data 82.

The current position determining unit 53c determines whether or not the position of the robot 1 is located inside the first specific area 101. When the position of the robot 1 is not located inside the first specific area 101, the current second piece of mechanism data 82 is maintained. When the position of the robot 1 is located inside the first specific area 101, the selecting unit 53 selects the sixth piece of mechanism data 86 corresponding to the first specific area 101. The switching operation setting unit 54 sets an operation of the robot 1 for switching the second piece of mechanism data 82 to the sixth piece of mechanism data 86. The operation control unit 43 changes the position and orientation of the robot 1 based on a command from the switching operation setting unit 54. After that, the operation control unit 43 drives the robot based on the sixth piece of mechanism data 86.

The current position determining unit 53c can determine the position of the robot 1 at predetermined time intervals. When the position of the robot 1 is out of the specific area 101, the selecting unit 53 selects the original second piece of mechanism data 82. The switching operation setting unit 54 sets an operation for switching the sixth piece of mechanism data 86 to the second piece of mechanism data 82. The selecting unit 53 selects the seventh piece of mechanism data 87 when the position of the robot 1 is located inside the second specific area. The switching operation setting unit 54 can set an operation for switching the current mechanism data to the seventh piece of mechanism data 87.

In the third control, mechanism data corresponding to a specific area can be adopted when it is desired to improve the control accuracy of the robot 1 in the specific area. For example, inside the specific area 101, the positions and orientations of the robot are close to each other. Mechanism data corresponding to such positions and orientations of the robot can be created in advance. In the third control, it is possible to improve the accuracy of controlling the position and orientation of the robot when the position of the robot is located inside the specific area.

Incidentally, the position and orientation of the robot 1 change when the mechanism data changing unit 51 changes the mechanism data. The switching operation setting unit 54 changes the position and orientation of the robot 1 based on mechanism data before having been changed thereto and mechanism data after having been changed thereto. In this regard, if the position and orientation of the robot 1 change abruptly, the robot 1 or the operation tool may come into strong contact with devices, objects, or the like arranged around the robot 1. This may damage devices or objects arranged around the robot 1. Alternatively, a sudden load may be applied to the robot or a sudden load may be applied to the operation tool due to the weight of the robot and the weight of the operation tool. This may have adverse effects on the robot or the operation tool. In fourth control of the present embodiment, the position and orientation of the robot 1 are controlled so as to avoid sudden movements of the robot 1 when mechanism data is switched.

Figure 9:
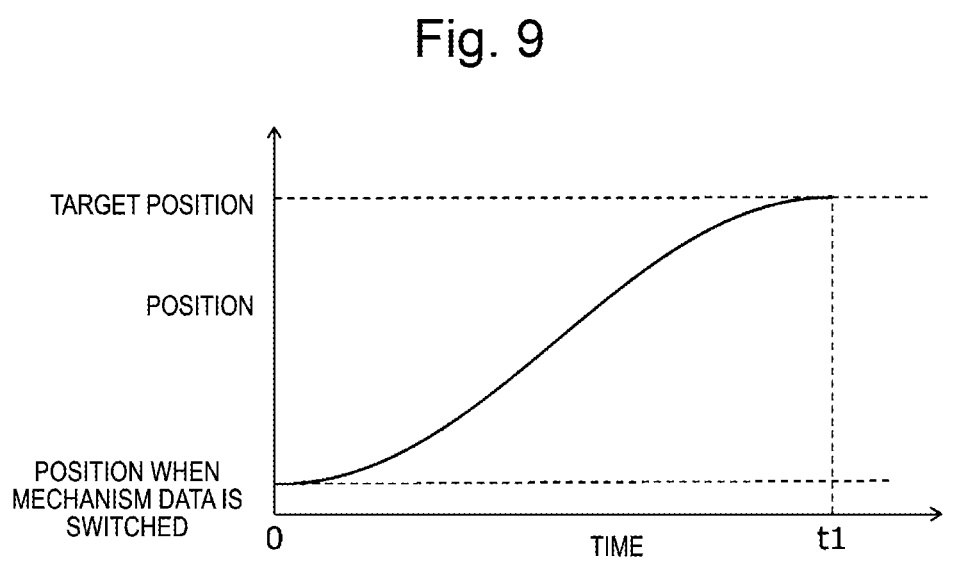

FIG. 9 shows a graph of the position of the robot for explaining the fourth control of the first robot device of the present embodiment. FIG. 9 shows the position of the robot that moves when the mechanism data is switched. In other words, FIG. 9 shows a change in position from a position of the robot based on mechanism data before having been changed thereto to a target position of the robot based on mechanism data after having been changed thereto.

In the fourth control, the switching operation setting unit 54 sets an operation of the robot 1 for gradually reaching a position and orientation of the robot 1 based on mechanism data selected by the selecting unit 53 in a predetermined length of time t1. In the example shown in FIG. 9, the setting is made so that the change in driving speed of the robot 1 is small near the start of driving the robot 1 (immediately after the start) and near the end of driving the robot 1 (immediately before the end). The position and orientation of the robot slowly change over the predetermined time t1.

Performing the fourth control can prevent the robot or the operation tool from coming into strong contact with other devices or objects or from applying an excessive load to the robot or the operation tool. The length of time t1 over which the robot moves from the current position to the target position based on the new mechanism data can be predetermined. Alternatively, the amount of change in speed over time and the amount of change in acceleration over time when driving the robot may be predetermined.

In this regard, the switching operation setting unit 54 can set an operation of the robot so that the speed of a predetermined portion of the robot 1 does not deviate from a predetermined determination range when driving the robot 1. For example, control can be performed so that the absolute value of speed is less than a determination value. Specifically, an operation of the robot can be set so that the moving speed of the tool center point, the moving speed of a center point of the flange, or the moving speed of a center point of the wrist is within a predetermined speed range.

Control may also be performed with determination values provided for speed components into which the velocity at each point is decomposed for the coordinate axes of a predetermined coordinate system. For example, the operation of the robot 1 may be controlled so that when the tool center point moves, the speed thereof does not exceed respective determination values for the coordinate axes of the world coordinate system. Alternatively, the switching operation setting unit 54 may perform control so that the rotation speed of the drive motor 21 disposed at each joint axis does not deviate from a predetermined determination range.

Control similar to speed limiting can also be performed for acceleration. The switching operation setting unit 54 can set an operation of the robot so that the acceleration of a predetermined portion of the robot does not deviate from a predetermined determination range when driving the robot. For example, control can be performed so that the absolute value of acceleration is less than a determination value. Specifically, an operation of the robot can be set so that the acceleration of a predetermined point such as the tool center point is within a predetermined acceleration range. Other control is similar to the speed-limiting control.

Performing such speed-limiting control or acceleration-limiting control can prevent an excessive load from being applied to the robot or the operation tool. This can also prevent damage to the robot, the operation tool, or nearby devices or objects when the robot or the operation tool comes into contact with the nearby devices or objects.

Figure 10:
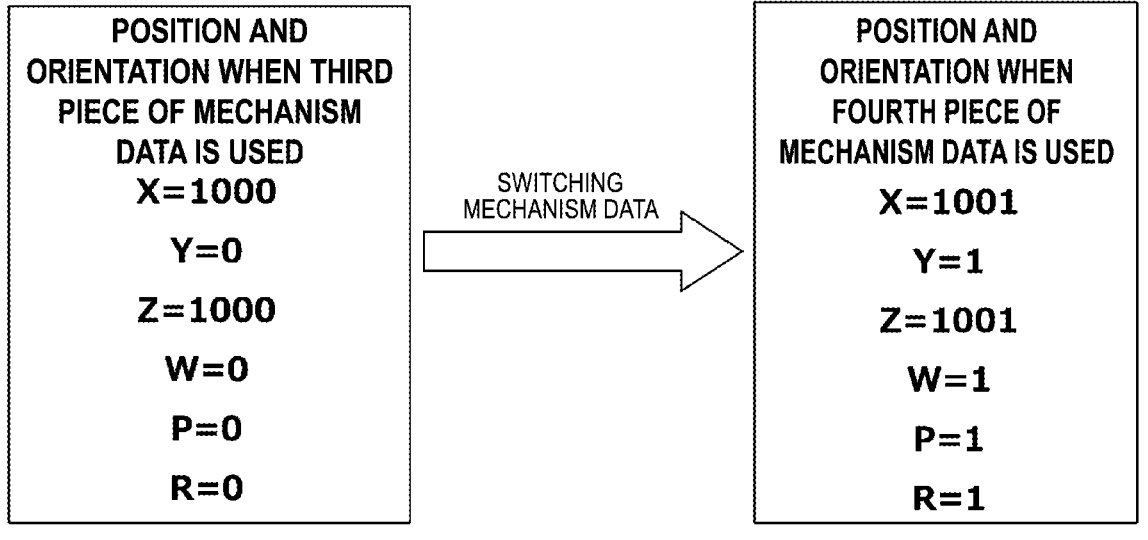
FIG. 10 is an explanatory diagram of fifth control of the first robot device.

FIG. 10 shows an explanatory diagram of fifth control of the first robot device of the present embodiment. In the control described above, when mechanism data is switched, the switching operation setting unit 54 changes the position and orientation of the robot according to mechanism data before having been changed thereto and mechanism data having been changed thereto. However, a trajectory of the position and orientation of the robot that is previously taught may be changed by changing the mechanism data. Thus, the operator may need to perform teaching work again to correct the positions and orientations of the robot at the teaching points.

In the fifth control, the switching operation setting unit 54 keeps the robot stopped when changing the mechanism data. In other words, the switching operation setting unit 54 performs control for maintaining the position and orientation of the robot. The current position and orientation are corrected assuming that the position and orientation of the robot 1 calculated by using the switched mechanism data are correct.

The example shown in FIG. 10 shows control performed when the third piece of mechanism data 83 for the first operation program is switched to the fourth piece of mechanism data 84 for the second operation program. The position and orientation of the robot 1 calculated based on each piece of mechanism data are represented by coordinate values of the world coordinate system 71.

Switching the mechanism data changes, for example, the X-axis coordinate value from 1000 to 1001. However, the switching operation setting unit 54 corrects the current X-axis coordinate value to 1001 without driving the robot 1. Alignment is also performed for the Y axis, the Z axis, the W axis, the P axis, and the R axis without driving the robot 1, assuming that the coordinate values calculated based on the fourth piece of mechanism data are correct. The coordinate values displayed on the display part 49b of the teach pendant 49 are the coordinate values obtained by using the fourth piece of mechanism data.

Performing the fifth control can avoid changes in the position and orientation of the robot when changing the mechanism data, thereby avoiding contacting nearby devices or objects or avoiding applying an excessive load to the robot or the operation tool.

Second Embodiment

A correction device according to a second embodiment will be described with reference to FIGS. 11 to 13. The correction device according to the present embodiment corrects an operation program of the robot device based on mechanism data corresponding to the operation program.

Figure 11:
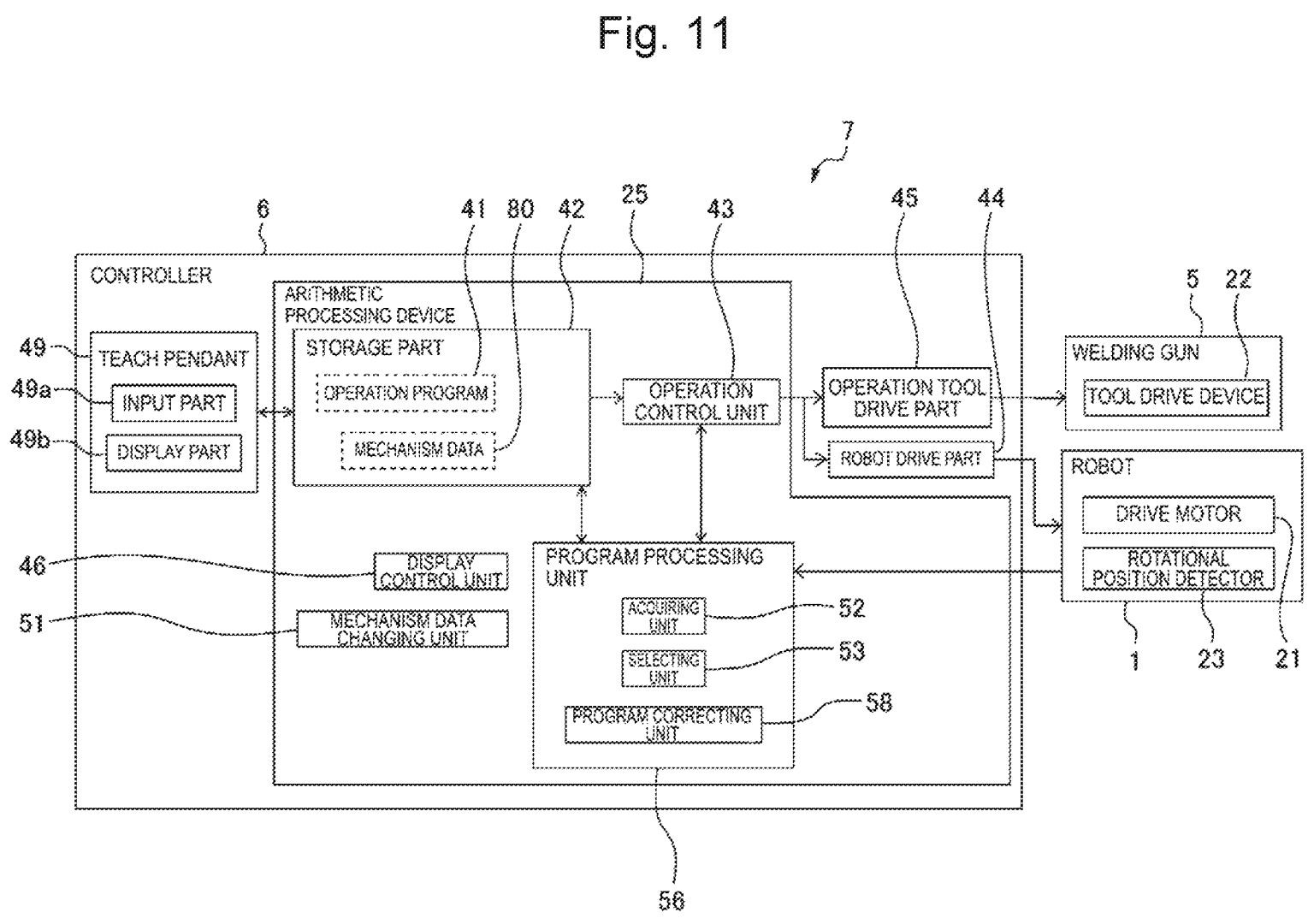

FIG. 11 shows a block diagram of a second robot device of the present embodiment. The second robot device 7 includes a robot 1, a welding gun 5, and a controller 6. The controller 6 includes an arithmetic processing device 25 and a teach pendant 49. In this example, the controller 6 for the robot functions as the correction device. The arithmetic processing device 25 is made of a computer including a CPU serving as a processor. The arithmetic processing device 25 includes a program processing unit 56 that performs control for correcting the operation program 41. The arithmetic processing device 25 has the configuration of the arithmetic processing device 24 of the controller 2 for the first robot device 3 with a program processing unit 56 added thereto.

The program processing unit 56 includes an acquiring unit 52 and a selecting unit 53 similar to those of the mechanism data changing unit 51 of the first robot device 3 according to the first embodiment. The program processing unit 56 includes a program correcting unit 58 that corrects the operation program based on mechanism data selected by the selecting unit 53. The program processing unit 56, the acquiring unit 52, the selecting unit 53, and the program correcting unit 58 each correspond to a processor that is driven based on a predetermined program. The processor functions as each unit by performing processing based on the predetermined program.

Figure 12:
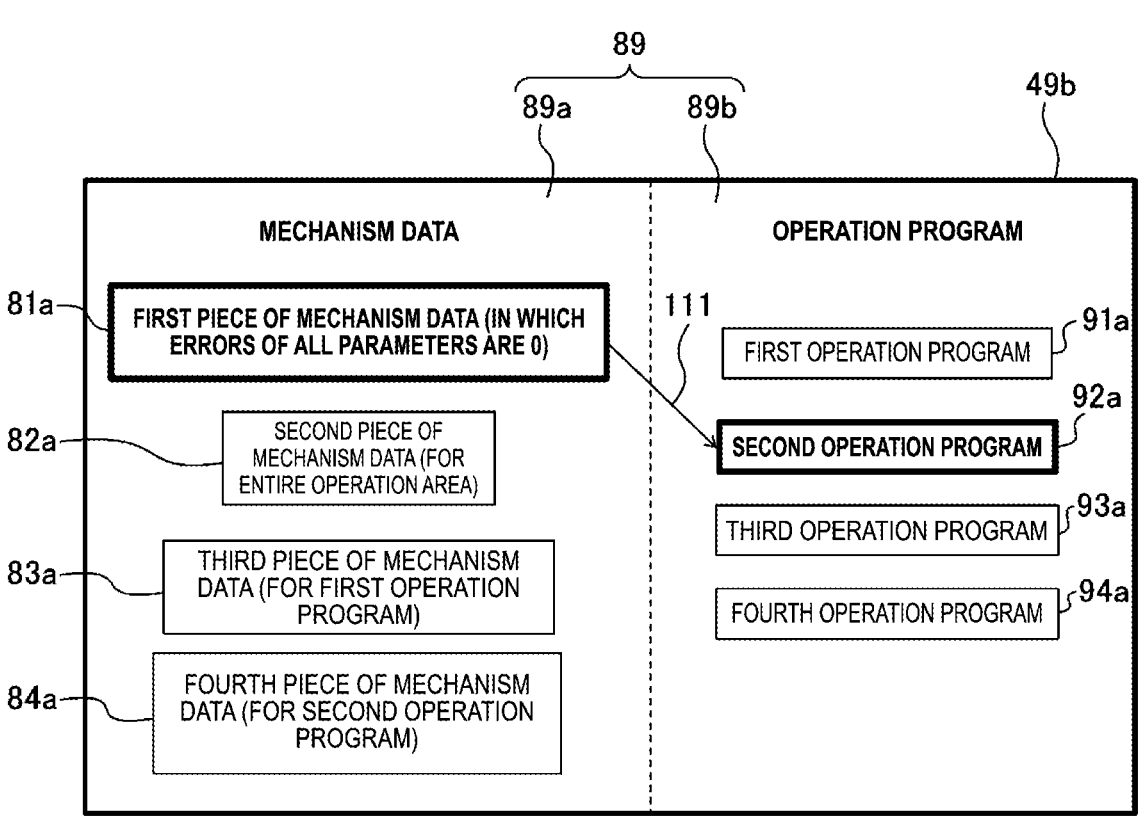
FIG. 12 is an image displayed on a display part when performing first control of the correction device.
Figure 13:
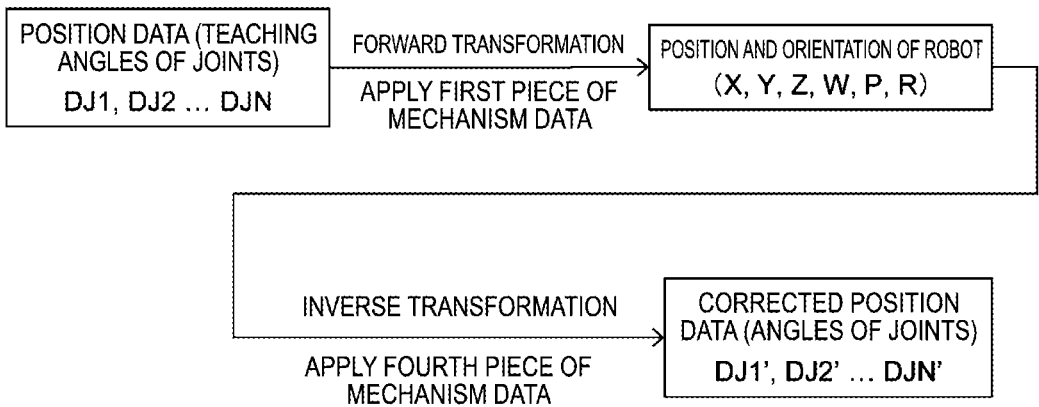
FIG. 13 is a block diagram for illustrating second control of the correction device.

FIG. 12 shows an example of an image displayed on the display part of the teach pendant. Control for adding to the operation program a command statement of mechanism data to be applied to the operation program is performed in first control of the correction device of the present embodiment. The display control unit 46 controls the image displayed on the display part 49b. A display area 89 of the display part 49b has a display area 89a for displaying a plurality of pieces of mechanism data and a display area 89b for displaying a plurality of operation programs. One operation program may also be displayed in the display area 89b. In this example, a plurality of mechanism data images 81a, 82a, 83a, and 84a are displayed in the display area 89a. A plurality of operation program images 91a, 92a, 93a, and 94a are displayed in the display area 89b.

The operator can operate the image displayed on the display part 49b by operating the input part 49a. In this example, the operator performs setting so as to use the first piece of mechanism data with respect to the second operation program. For example, the operator selects the image 92a of the second operation program after selecting the image 81a of the first piece of mechanism data. Then, a predetermined button for setting the mechanism data is pressed. Performing this operation causes the selecting unit 53 to select the first piece of mechanism data for the second operation program as indicated by an arrow 111. The selecting unit 53 selects one piece of mechanism data from the plurality of pieces of mechanism data in response to an operation of the input part 49a by the operator.

The program correcting unit 58 corrects the operation program based on the first piece of mechanism data selected by the selecting unit 53. The program correcting unit 58 adds a command statement for applying the first piece of mechanism data selected by the selecting unit 53 to the second operation program. The program correcting unit 58 can add to the operation program a command statement for applying the mechanism data selected by the selecting unit 53 to the entirety of one operation program. For example, a command statement for controlling the robot by using the first piece of mechanism data can be recorded in a beginning part of the second operation program. When the second operation program is executed, the first piece of mechanism data can be automatically adopted.

Alternatively, the display control unit 46 can display the contents of one operation program in the display area 89b for displaying operation programs. In other words, it is possible to display all command statements included in the operation program. The selecting unit 53 can select a specific command statement for applying a piece of mechanism data through an operation of the input part 49a by the operator. The program correcting unit 58 can add a command statement for applying the mechanism data selected by the selecting unit 53 with respect to the specific command statement in the operation program.

Thus, in the first control of the correction device, an operation program can be corrected through an operation by the operator so that a desired piece of mechanism data is applied to the entirety or a part of the operation program. When the robot 1 is driven, the mechanism data changing unit 51 can read the corrected operation program, thereby controlling the robot 1 while setting or changing the mechanism data.

Next, second control of the correction device of the present embodiment will be described. FIG. 13 shows a block diagram for explaining the second control of the correction device. An operation program includes position data composed of variables that determine the positions and orientations of the robot at teaching points. Control for rewriting the variables of the position data of the operation program with values corresponding to the mechanism data is performed in the second control. In other words, the program correcting unit 58 calculates variables that determine the position and orientation of the robot when the mechanism data selected by the selecting unit 53 is used and sets the calculated variables in the position data.

This example will be described by using an example in which the fourth piece of mechanism data is applied to the operation program. The position data is composed of teaching angles DJ1 to DJN at the joints. For example, the teaching angle DJ1 indicates a teaching angle of the joint of the joint axis J1. The program correcting unit 58 applies the first piece of mechanism data which is mechanism data with design values. The program correcting unit 58 calculates the position and orientation of the robot based on forward kinematics. At this time, the first piece of mechanism data in which the errors of all parameters are 0 is used. In other words, the program correcting unit 58 calculates an ideal position and orientation of the robot by using the mechanism data as designed.

Next, the program correcting unit 58 calculates angles DJ1' to DJN' of the joints as variables of corrected position data by inverse kinematics based on the position and orientation of the robot. At this time, the program correcting unit 58 applies the fourth piece of mechanism data. The program correcting unit 58 performs control for rewriting the teaching angles DJ1 to DJN of the joints in the position data of the operation program with angles DJ1' to DJN' of the joints.

When work is performed by actually driving the robot, control can be performed by using an operation program including the corrected position data and mechanism data corresponding to the operation program. In the above example, the position and orientation of the robot can be brought closer to a desired position and orientation by controlling the robot 1 by using the angles DJ1' to DJN' of the joints and the fourth piece of mechanism data. In this case, the robot can be controlled based on the corrected position data without the need to perform the control for forward transformation and reverse transformation illustrated in FIG. 5.

In this way, the program correcting unit can correct position data including variables that determine the position and orientation of the robot based on mechanism data. The correction device of the present embodiment can generate an operation program for driving the robot with high accuracy.

Other configurations, operations, and advantages of the second robot device including the correction device are similar to those of the first robot device of the first embodiment and thus description thereof will not be repeated here.

Third Embodiment

Figure 14:
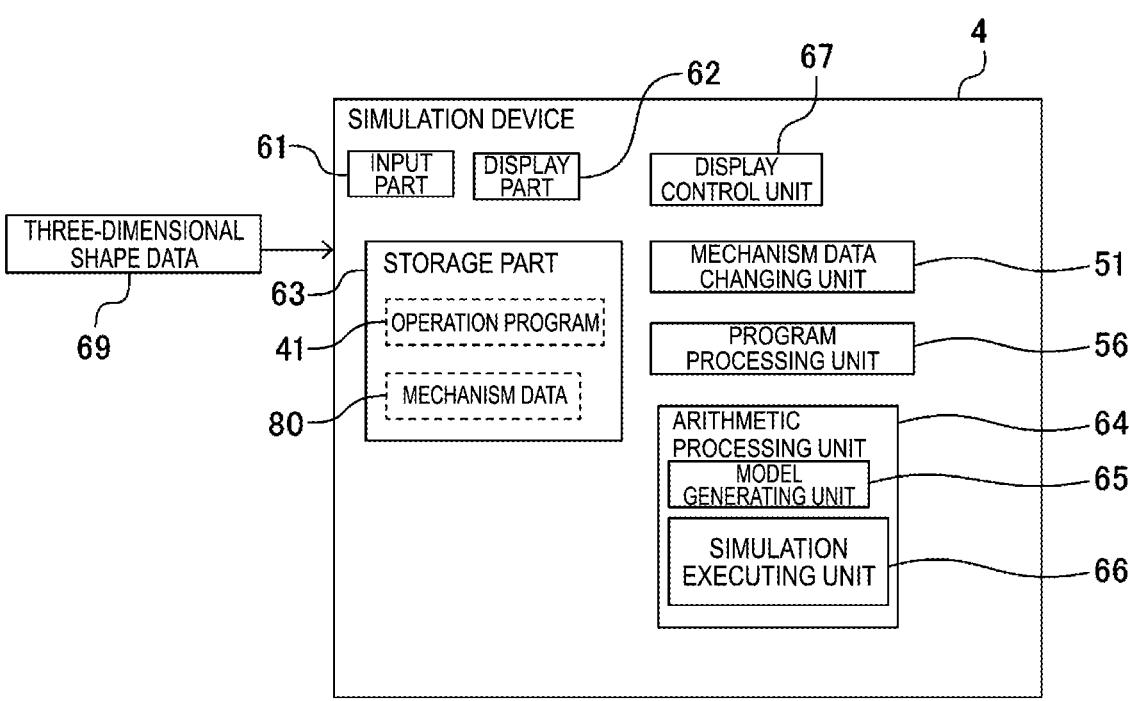
FIG. 14 is a block diagram of a simulation device according to a third embodiment.

A simulation device according to a third embodiment will be described with reference to FIG. 14. FIG. 14 shows a block diagram of the simulation device of the present embodiment. The simulation device 4 of the present embodiment is an offline simulation device formed so as to simulate the operation of the first robot device 3 of the first embodiment.

The simulation device 4 arranges a three-dimensional model of the robot 1, a three-dimensional model of the welding gun 5, and a three-dimensional model of the workpiece 98 in the same virtual space and simulates the operation of the robot device 3.

The simulation device 4 is made of an arithmetic processing device (a computer) including a CPU as a processor. The simulation device 4 includes a storage part 63 that stores arbitrary information regarding simulation of the robot device 3. The storage part 63 can be made of a nontemporary storage medium capable of storing information. For example, the storage part 63 can be made of a storage medium such as a volatile memory, a nonvolatile memory, a magnetic storage medium, or an optical storage medium.

Three-dimensional shape data 69 of the robot 1, the welding gun 5, and the workpiece 98 are input to the simulation device 4. For example, data output from a computer aided design (CAD) device can be used as the three-dimensional shape data 69. The three-dimensional shape data 69 is stored in the storage part 63. An operation program 41 of the robot device 3 that performs the simulation is input to the simulation device 4 and stored in the storage part 63. Predetermined mechanism data 80 is also stored in the storage part 63.

The simulation device 4 includes an input part 61 for inputting information regarding simulation of the robot device 3. The input part 61 is made of operating members such as a keyboard, a mouse, and dials. The simulation device 4 includes a display part 62 that displays information regarding simulation of the robot device 3. The display part 62 displays an image of the model of the robot device 3, an image of the model of the workpiece 98, and the like. The display part 62 is made of a display panel such as a liquid crystal display panel. When the simulation device includes a display panel of touch panel type, the display panel functions as an input part and a display part.

The simulation device 4 includes an arithmetic processing unit 64 that performs arithmetic processing for simulation of the robot device 3. The arithmetic processing unit 64 includes a model generating unit 65 that generates a model of the robot device and a model of the workpiece based on the three-dimensional shape data 69 that includes three-dimensional shape data of the robot device 3 and three-dimensional shape data of the workpiece 98. The arithmetic processing unit 64 includes a simulation executing unit 66 that simulates the operation of the robot device 3.

The simulation executing unit 66 has a function of activating the model of the robot device on a screen in response to an operation of the input part 61 by the operator. Alternatively, the simulation executing unit 66 simulates the operation of the robot device 3 based on the operation program 41 created in advance.

The arithmetic processing unit 64, the model generating unit 65, and the simulation executing unit 66 each correspond to a processor that is driven in accordance with a simulation program. The processor functions as each unit by executing control defined in the program.

The simulation device 4 includes a display control unit 67 that controls an image displayed on the display part 62, a mechanism data changing unit 51, and a program processing unit 56. The display control unit 67 of the present embodiment displays a simulation result on the display part 62. The display control unit 67 and the mechanism data changing unit 51 are similar to the display control unit and the mechanism data changing unit of the first robot device 3 according to the first embodiment. The program processing unit 56 is also similar to the program processing unit of the second robot device 7 according to the second embodiment.

The simulation device 4 can also include the mechanism data changing unit 51 and the program correcting unit 58. The simulation device 4 can simulate a robot device having mechanism data that has been changed by the mechanism data changing unit 51. Alternatively, the program processing unit 56 can correct the operation program based on the mechanism data.

When the mechanism data changing unit changes the mechanism data or the program processing unit corrects the operation program, the trajectory of the position and orientation of the robot may change. The operator can check the operation of the robot by using the simulation device. If the trajectory of the position and orientation of the robot is inappropriate, the variables that determine the positions and orientations of the robot at the teaching points can be adjusted while performing a simulation with the simulation device 4.

Other configurations, operations, and advantages of the simulation device are similar to those of the robot device according to the first embodiment and the robot device according to the second embodiment and thus description thereof will not be repeated here.

The above embodiments can be combined as appropriate. In each of the above drawings, the same reference numerals are given to the same or equivalent parts. The above embodiments are examples and do not limit the invention. The embodiments also include modifications of the embodiments indicated in the claims.

REFERENCE SIGNS LIST

1 Robot
2, 6 Controller
3,7 Robot device
4 Simulation device
21 Drive motor
23 Rotational position detector
24, 25 Arithmetic processing device
41 Operation program
42 Storage part
43 Operation control unit
49 Teach pendant
49*a* Input part
49*b* Display part
51 Mechanism data changing unit
52 Acquiring unit
53 Selecting unit
54 Switching operation setting unit
56 Program processing unit
58 Program correcting unit
61 Input part
62 Display part
63 Storage part
64 Arithmetic processing unit
80, 81, 82, 83, 84, 85, 86, 87 Mechanism data
101 Specific area

The invention claimed is:

1. A controller for a robot having a joint, the controller comprising:

a processor configured to:

control an operation of the robot using mechanism data including mechanism error parameters and a parameter used to calculate a relationship between an angle of a joint of the robot and a distal end position of the robot;

acquire a plurality of predetermined mechanism error parameters;

select one mechanism error parameter from the plurality predetermined mechanism error parameters; and set an operation of the robot responsive to the mechanism error parameter being changed, wherein the processor controls the operation of the robot according to an operation program, and selects the mechanism error parameter corresponding to the operation program used to control the operation of the robot.

2. The controller of claim 1, wherein the processor is configured to set the operation of the robot so that a position and orientation of the robot based on a current mechanism error parameter become a position and orientation of the robot based on the mechanism error parameter selected by the processor.

3. The controller of claim 2, wherein the processor is configured to set the operation of the robot so as to gradually reach the position and orientation of the robot based on the mechanism error parameter selected by the processor in a predetermined length of time.

4. The controller of claim 2, wherein the processor is configured to set the operation of the robot so that a speed of a predetermined portion of the robot does not deviate from a predetermined determination range when driving the robot.

5. The controller of claim 2, wherein the processor is configured to set the operation of the robot so that an acceleration of a predetermined portion of the robot does not deviate from a predetermined determination range when driving the robot.

6. The controller of claim 1, wherein the processor is configured to maintain the position and orientation of the robot when changing the mechanism error parameter.

7. The controller of claim 1, wherein the robot includes a drive motor configured to drive a component of the robot and a rotational position detector configured to detect a rotational position of the drive motor, and the mechanism data includes an output value of the rotational position detector when a position of the robot is arranged at a predetermined reference position.

8. The controller of claim 1, wherein the mechanism data includes a matrix or a relational expression indicating a relative positional relationship between a plurality of the joints in the robot, the plurality of the joints being adjacent to each other.

9. The controller of claim 8, wherein the matrix or the relational expression includes an error with respect to a design value.

10. The controller of claim 1, wherein the mechanism error parameter corresponding to a specific area that is a part of an area in which the robot is driven is predetermined, and the processor is configured to select the mechanism error parameter corresponding to the specific area when a position of the robot is arranged inside the specific area.

11. A correction device for an operation program of a robot having a joint, the correction device comprising:

a storage configured to store mechanism data including a mechanism error parameter and a parameter used to calculate a relationship between an angle of a joint of the robot and a distal end position of the robot:

a processor configured to acquire, from the storage, a plurality of mechanism error parameters created in advance;

a display including an area for displaying the plurality of pieces of the mechanism error parameters data and an area for displaying the operation program;

a keyboard through which an operator operates an image displayed on the display;

wherein the processor is configured to select one mechanism error parameter from the plurality of mechanism error parameters in response to an operation of the keyboard by the operator; and correct the operation program based on the one piece of the mechanism data selected by the processor, wherein the mechanism error parameter is a parameter used in a calculation formula to calculate a rotational position of a drive motor of the robot from a variable defining a position and a posture of the robot set in the operating program.

12. The correction device of claim 11, wherein the processor is configured to record, in the operation program, a command statement for applying the mechanism error parameter selected by the processor.

13. The correction device of claim 12, wherein the processor is configured to record, in the operation program, a command statement for applying the mechanism error parameter selected by the processor with respect to an entirety of one of the operation programs.

14. The correction device of claim 11, wherein the operation program includes position data constituted by variables that determine a position and orientation of the robot at a teaching point, and the processor is configured to calculate the variables that determine the position and orientation of the robot when the mechanism error parameter selected by the processor is used, and to set the variables in the position data.

* * * * *